(12) United States Patent  (10) Patent No.: US 9,090,021 B2
Cham et al.  (45) Date of Patent: Jul. 28, 2015

(54) ULTRASONIC SEALING OF PACKAGES

(75) Inventors: Pak Meng Cham, Plano, TX (US);
Glenn T. Jordan, IV, Prosper, TX (US);
Austin Kozman, Dallas, TX (US); Sean Flowers, Cincinnati, OH (US); Matthew Short, Wilmington, OH (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 284 days.

(21) Appl. No.: 13/565,310

(22) Filed: Aug. 2, 2012

(65) Prior Publication Data
US 2014/0033653 A1  Feb. 6, 2014

(51) Int. Cl.
*B32B 37/00* (2006.01)
*B29C 65/08* (2006.01)
(Continued)

(52) U.S. Cl.
CPC ............... *B29C 65/08* (2013.01); *B29C 65/085* (2013.01); *B29C 65/7443* (2013.01); *B29C 65/8223* (2013.01); *B29C 66/1122* (2013.01); *B29C 66/346* (2013.01); *B29C 66/3462* (2013.01); *B29C 66/43* (2013.01); *B29C 66/8167* (2013.01); *B29C 66/81422* (2013.01); *B29C 66/81427* (2013.01); *B29C 66/81457* (2013.01); *B29C 66/81469* (2013.01); *B29C 66/81811* (2013.01); *B29C 66/81831* (2013.01); *B29C 66/8244* (2013.01); *B29C 66/836* (2013.01); *B29C 66/8322* (2013.01); *B29C 66/83411* (2013.01); *B29C 66/92445* (2013.01); *B29C 66/92451* (2013.01); *B29C 66/92651* (2013.01); *B29C 66/932* (2013.01); *B29C 66/93451* (2013.01); *B29C 66/9513* (2013.01);
(Continued)

(58) Field of Classification Search
CPC .. B29C 65/08; B29C 65/081; B29C 65/7443; B29C 66/1122; B29C 66/346; B29C 66/43; B29C 66/81422; B29C 66/81469; B29C 66/8167; B29C 66/8322; B29C 66/83411; B65B 3/02
USPC ............... 156/73.1, 73.3, 250, 251, 510, 515, 156/530, 580.1, 580.2; 53/452
See application file for complete search history.

(56) References Cited

U.S. PATENT DOCUMENTS 3,113,888 A  12/1963  Gold
3,217,957 A *  11/1965  Jarvie et al. ..................... 228/1.1
(Continued)

FOREIGN PATENT DOCUMENTS

CN  1386631 A  12/2002
DE  19523530 C1  9/1996
(Continued)

OTHER PUBLICATIONS

Hashimoto et al. (JP 2000-185381) English translation, Apr. 7, 2000 (10 pages).
(Continued)

*Primary Examiner* — James Sells
(74) *Attorney, Agent, or Firm* — Colin P. Cahoon; James H. Ortega; Carstens & Cahoon, LLP

(57) ABSTRACT

A method and apparatus for sealing films. In one embodiment the sealing device comprises a horn and an anvil. The film has a standard portion and an increased portion. Increased energy is applied to the film in the increased portion compared to the energy applied to the standard portion. Such a method allows for sealing of varying number of layers.

35 Claims, 6 Drawing Sheets

(51) Int. Cl.
  *B29C 65/82* (2006.01)
  *B29C 65/00* (2006.01)
  *B65B 51/22* (2006.01)
  *B29C 65/74* (2006.01)
  *B29C 65/78* (2006.01)
  *B65B 51/30* (2006.01)

(52) U.S. Cl.
  CPC ........... *B29C66/9516* (2013.01); *B65B 51/225* (2013.01); *B29C 65/081* (2013.01); *B29C 65/086* (2013.01); *B29C 65/087* (2013.01); *B29C 65/7437* (2013.01); *B29C 65/7891* (2013.01); *B29C 66/306* (2013.01); *B29C 66/4322* (2013.01); *B29C 66/43121* (2013.01); *B29C 66/72321* (2013.01); *B29C 66/72328* (2013.01); *B29C 66/81433* (2013.01); *B29C 66/8242* (2013.01); *B29C 66/83413* (2013.01); *B29C 66/83421* (2013.01); *B29C 66/841* (2013.01); *B29C 66/849* (2013.01); *B29C 66/863* (2013.01); *B29C 66/9512* (2013.01); *B29C 66/961* (2013.01); *B65B 51/30* (2013.01)

(56) References Cited

U.S. PATENT DOCUMENTS

| | | | |
|---|---|---|---|
| 3,258,386 A | | 6/1966 | Blythe |
| 3,438,428 A | | 4/1969 | Balamuth |
| 3,459,610 A | * | 8/1969 | Dijkers et al. ............... 156/73.1 |
| 3,477,970 A | | 11/1969 | Beeman |
| 3,498,798 A | | 3/1970 | Baur |
| 3,647,111 A | | 3/1972 | Stager |
| 3,657,033 A | * | 4/1972 | Sager ........................ 156/73.3 |
| 4,198,256 A | | 4/1980 | Andrews |
| 4,373,982 A | | 2/1983 | Kreager |
| 4,414,045 A | | 11/1983 | Wang |
| 4,418,841 A | | 12/1983 | Eckstein |
| 4,517,790 A | * | 5/1985 | Kreager ...................... 53/552 |
| 4,551,371 A | | 11/1985 | Eckstein |
| 4,572,753 A | | 2/1986 | Bach |
| 4,595,611 A | | 6/1986 | Quick |
| 4,647,332 A | | 3/1987 | Ranger |
| 4,859,513 A | | 8/1989 | Gibbons |
| 4,892,911 A | | 1/1990 | Genske |
| 4,982,872 A | | 1/1991 | Avery |
| 5,057,182 A | | 10/1991 | Wuchinich |
| 5,059,804 A | | 10/1991 | Fink |
| 5,108,807 A | | 4/1992 | Tucker |
| 5,153,061 A | | 10/1992 | Cavagna |
| 5,155,604 A | | 10/1992 | Miekka |
| 5,180,765 A | | 1/1993 | Sinclair |
| 5,192,620 A | | 3/1993 | Chu |
| 5,205,473 A | | 4/1993 | Coffin |
| 5,213,858 A | | 5/1993 | Tanner et al. |
| 5,216,043 A | | 6/1993 | Sipinen |
| 5,230,963 A | | 7/1993 | Knoerzer |
| 5,250,627 A | | 10/1993 | Yamamoto |
| 5,296,070 A | | 3/1994 | Take |
| 5,332,586 A | | 7/1994 | DiMino |
| 5,391,423 A | | 2/1995 | Wnuk |
| 5,458,933 A | | 10/1995 | Suskind |
| 5,487,940 A | | 1/1996 | Bianchini |
| 5,500,459 A | | 3/1996 | Hagemeyer |
| 5,506,036 A | | 4/1996 | Bergerioux |
| 5,508,113 A | | 4/1996 | Knoerzer |
| 5,512,338 A | | 4/1996 | Bianchini |
| 5,525,421 A | | 6/1996 | Knoerzer |
| 5,540,962 A | | 7/1996 | Suskind |
| 5,552,013 A | * | 9/1996 | Ehlert et al. ................ 156/555 |
| 5,587,048 A | | 12/1996 | Streisel |
| 5,604,042 A | | 2/1997 | Bianchini |
| 5,631,066 A | | 5/1997 | O'Brien |
| 5,654,039 A | | 8/1997 | Wenzel et al. |
| 5,679,421 A | | 10/1997 | Brinton, Jr. |
| 5,731,093 A | | 3/1998 | Chang |
| 5,736,204 A | | 4/1998 | Suskind |
| 5,747,633 A | | 5/1998 | Ito |
| 5,750,225 A | | 5/1998 | Petty |
| 5,756,651 A | | 5/1998 | Chen |
| 5,766,637 A | | 6/1998 | Shine |
| 5,776,842 A | | 7/1998 | Wood |
| 5,837,383 A | | 11/1998 | Wenzel et al. |
| 5,849,374 A | | 12/1998 | Gruber |
| 5,891,576 A | | 4/1999 | Imai |
| 5,895,723 A | | 4/1999 | Utz |
| 5,908,918 A | | 6/1999 | Chen |
| 5,939,467 A | | 8/1999 | Wnuk |
| 5,948,546 A | | 9/1999 | Bafford |
| 5,985,772 A | | 11/1999 | Wood |
| 6,003,670 A | | 12/1999 | Beer |
| 6,025,028 A | | 2/2000 | Asrar |
| 6,027,677 A | | 2/2000 | Ostapchenko |
| 6,033,747 A | | 3/2000 | Shiotani |
| 6,036,796 A | | 3/2000 | Halbert |
| 6,071,618 A | | 6/2000 | Cook |
| 6,080,478 A | | 6/2000 | Karhuketo |
| 6,132,822 A | | 10/2000 | Overcash |
| 6,146,508 A | | 11/2000 | Gopalraja |
| 6,168,857 B1 | | 1/2001 | Andersen |
| 6,176,953 B1 | | 1/2001 | Landreth |
| 6,183,814 B1 | | 2/2001 | Nangeroni et al. |
| 6,193,911 B1 | | 2/2001 | Hunt |
| 6,200,404 B1 | | 3/2001 | Andersen |
| 6,207,792 B1 | | 3/2001 | Gruber |
| 6,232,389 B1 | | 5/2001 | Feeney |
| 6,235,825 B1 | | 5/2001 | Yoshida |
| 6,245,437 B1 | | 6/2001 | Shiiki |
| 6,248,430 B1 | | 6/2001 | Toyoda |
| 6,285,922 B1 | | 9/2001 | Bloss |
| 6,294,047 B1 | | 9/2001 | Chakar |
| 6,301,860 B1 | | 10/2001 | Gunderman |
| 6,338,870 B1 | | 1/2002 | Jaccoud |
| 6,350,531 B1 | | 2/2002 | Sugimoto |
| 6,358,576 B1 | | 3/2002 | Adur |
| 6,361,609 B1 | | 3/2002 | Ouellette |
| 6,387,211 B1 | | 5/2002 | Chakar |
| 6,492,613 B2 | | 12/2002 | Bollinger et al. |
| 6,511,563 B1 | | 1/2003 | Roylance |
| 6,523,732 B1 | | 2/2003 | Popoola |
| 6,544,607 B1 | | 4/2003 | Kuroki |
| 6,547,929 B2 | | 4/2003 | Bobsein |
| 6,573,340 B1 | | 6/2003 | Khemani |
| 6,574,944 B2 | | 6/2003 | Capodieci |
| 6,576,294 B1 | | 6/2003 | Phillips |
| 6,600,008 B1 | | 7/2003 | Kobayashi |
| 6,645,584 B1 | | 11/2003 | Kuusipalo |
| 6,649,732 B2 | | 11/2003 | Kobayashi |
| 6,660,008 B1 | | 12/2003 | Foerster |
| 6,660,211 B2 | | 12/2003 | Topolkaraev |
| 6,677,048 B2 | | 1/2004 | Karhuketo |
| 6,709,718 B2 | | 3/2004 | O'Brien |
| 6,716,499 B1 | | 4/2004 | Vadhar |
| 6,740,731 B2 | | 5/2004 | Bigg |
| 6,769,229 B2 | | 8/2004 | Kinigakis |
| 6,811,826 B2 | | 11/2004 | Rule et al. |
| 6,815,079 B2 | | 11/2004 | Rosenbaum |
| 6,824,632 B2 | | 11/2004 | Blanchard |
| 6,863,644 B1 | | 3/2005 | Cook |
| 6,877,975 B2 | | 4/2005 | Wuchinich |
| 6,942,821 B2 | | 9/2005 | Dayrit |
| 6,960,374 B1 | | 11/2005 | Terada |
| 6,974,612 B1 | | 12/2005 | Frisk |
| 6,977,113 B2 | | 12/2005 | Kody |
| 6,984,443 B2 | | 1/2006 | Kuroki |
| 7,060,142 B2 | | 6/2006 | Yamamoto |
| 7,128,969 B2 | | 10/2006 | Busch |
| 7,132,490 B2 | | 11/2006 | Obuchi et al. |
| 7,160,977 B2 | | 1/2007 | Hale |
| 7,172,814 B2 | | 2/2007 | Hodson |
| 7,173,080 B2 | | 2/2007 | Yamada |
| 7,214,414 B2 | | 5/2007 | Khemani |
| 7,223,359 B2 | | 5/2007 | Torkelson |
| 7,351,449 B2 | | 4/2008 | Hunt |

(56) References Cited

U.S. PATENT DOCUMENTS

| | | |
|---|---|---|
| 7,351,785 B2 | 4/2008 | Matsumoto |
| 7,368,160 B2 | 5/2008 | Inglis |
| 7,422,782 B2 | 9/2008 | Haedt |
| 7,514,528 B2 | 4/2009 | Kauffman |
| 7,520,959 B2 | 4/2009 | Kikuchi |
| 7,718,718 B2 | 5/2010 | Kanzawa |
| 7,771,551 B2 | 8/2010 | Schroeder |
| 7,785,682 B2 | 8/2010 | Sato et al. |
| 7,794,555 B2 | 9/2010 | LaFond |
| 7,842,761 B2 | 11/2010 | Flynn |
| 7,854,994 B2 | 12/2010 | Henderson-Rutgers |
| 7,943,218 B2 | 5/2011 | Knoerzer |
| 7,951,436 B2 | 5/2011 | Knoerzer |
| 7,951,438 B2 | 5/2011 | Lee |
| 8,105,667 B2 | 1/2012 | Knoerzer |
| 8,201,606 B2 | 6/2012 | Specht |
| 8,225,583 B2 | 7/2012 | Waldherr |
| 8,507,084 B2 | 8/2013 | Deng |
| 8,734,933 B2 | 5/2014 | Paolilli et al. |
| 8,795,803 B2 | 8/2014 | Paolilli et al. |
| 8,859,056 B2 | 10/2014 | O'Neill et al. |
| 2001/0001284 A1 | 5/2001 | Shaw |
| 2002/0014318 A1 | 2/2002 | Bobsein |
| 2002/0098341 A1 | 7/2002 | Schiffer |
| 2002/0127358 A1 | 9/2002 | Berlin |
| 2002/0160201 A1 | 10/2002 | Ohkura |
| 2003/0008136 A1 | 1/2003 | Bliznyuk |
| 2003/0162013 A1 | 8/2003 | Topolkaraev |
| 2003/0166748 A1 | 9/2003 | Khemani |
| 2003/0193104 A1 | 10/2003 | Melican |
| 2003/0215644 A1 | 11/2003 | Deshpande |
| 2004/0029258 A1 | 2/2004 | Heaney |
| 2004/0076778 A1 | 4/2004 | Mori |
| 2004/0115424 A1 | 6/2004 | Cowton |
| 2004/0185287 A1 | 9/2004 | Reighard |
| 2004/0229327 A1 | 11/2004 | Agblevor |
| 2005/0096422 A1 | 5/2005 | Torkelson |
| 2005/0112363 A1 | 5/2005 | Ning |
| 2005/0136202 A1 | 6/2005 | Kendig |
| 2005/0194110 A1 | 9/2005 | Richardson |
| 2006/0019045 A1 | 1/2006 | Bourgeois |
| 2006/0046006 A1 | 3/2006 | Bastion et al. |
| 2006/0057260 A1 | 3/2006 | Barry |
| 2006/0069234 A1 | 3/2006 | Kauffman |
| 2006/0099436 A1 | 5/2006 | Schwark |
| 2006/0110615 A1 | 5/2006 | Karim |
| 2006/0144905 A1 | 7/2006 | Oblak |
| 2006/0159860 A1 | 7/2006 | Korowicki |
| 2006/0177674 A1 | 8/2006 | Aritake |
| 2006/0194010 A1 | 8/2006 | Hiscock |
| 2006/0207295 A1 | 9/2006 | Huenermann |
| 2006/0275563 A1 | 12/2006 | Duffy |
| 2006/0286323 A1 | 12/2006 | Siegel |
| 2007/0023123 A1 | 2/2007 | Sorensen |
| 2007/0037912 A1 | 2/2007 | Mohanty |
| 2007/0059541 A1 | 3/2007 | Yoshida |
| 2007/0154719 A1 | 7/2007 | Meijlink et al. |
| 2007/0158012 A1 | 7/2007 | Heil |
| 2007/0184220 A1 | 8/2007 | Cleveland |
| 2007/0224368 A1 | 9/2007 | Hara |
| 2007/0259139 A1 | 11/2007 | Furneaux |
| 2008/0038560 A1 | 2/2008 | Knoerzer |
| 2008/0069988 A1 | 3/2008 | Sato |
| 2008/0070274 A1 | 3/2008 | Rehkugler |
| 2008/0073505 A1 | 3/2008 | Niu |
| 2008/0107847 A1 | 5/2008 | Yamane et al. |
| 2008/0131616 A1 | 6/2008 | Besson |
| 2008/0241500 A1 | 10/2008 | Hoegg |
| 2009/0017240 A1 | 1/2009 | Charbonnel et al. |
| 2009/0022919 A1 | 1/2009 | Chicarella |
| 2009/0061126 A1 | 3/2009 | Knoerzer |
| 2009/0081396 A1 | 3/2009 | Hokari et al. |
| 2009/0142614 A1 | 6/2009 | Mori |
| 2009/0148713 A1 | 6/2009 | Lee |
| 2009/0148715 A1 | 6/2009 | Lee |
| 2009/0194450 A1 | 8/2009 | Dabadie |
| 2009/0199964 A1 | 8/2009 | Fayet |
| 2009/0200359 A1 | 8/2009 | Chen |
| 2009/0220794 A1 | 9/2009 | O'Neill |
| 2009/0250171 A1 | 10/2009 | Wieduwilt |
| 2009/0253871 A1 | 10/2009 | Flynn |
| 2009/0269580 A1 | 10/2009 | Shiba et al. |
| 2009/0286090 A1 | 11/2009 | Ting |
| 2009/0311544 A1 | 12/2009 | Lee |
| 2009/0324917 A1 | 12/2009 | Wang |
| 2009/0324972 A1 | 12/2009 | Hoffman et al. |
| 2010/0009208 A1 | 1/2010 | Lee |
| 2010/0040904 A1 | 2/2010 | Cloutier |
| 2010/0062269 A1 | 3/2010 | Ogita |
| 2010/0072104 A1 | 3/2010 | Kohl |
| 2010/0101722 A1 | 4/2010 | Suto |
| 2010/0147466 A1 | 6/2010 | Sans Marimon |
| 2010/0151130 A1 | 6/2010 | Ammerlaan |
| 2010/0178394 A1 | 7/2010 | Exner |
| 2010/0178523 A1 | 7/2010 | Iyengar et al. |
| 2010/0184891 A1 | 7/2010 | Akutsu et al. |
| 2010/0209614 A1 | 8/2010 | Sakata |
| 2010/0221560 A1 | 9/2010 | Knoerzer |
| 2010/0330382 A1 | 12/2010 | Dou |
| 2011/0005959 A1 | 1/2011 | Van Puijenbroek |
| 2011/0027590 A1 | 2/2011 | Abe |
| 2011/0072766 A1 | 3/2011 | Haus |
| 2011/0081543 A1 | 4/2011 | Lee |
| 2011/0104437 A1 | 5/2011 | Yamamura |
| 2011/0200844 A1 | 8/2011 | Fayne |
| 2011/0244185 A1 | 10/2011 | Dou |
| 2012/0111476 A1 | 5/2012 | Bang |
| 2012/0141766 A1 | 6/2012 | Paulino |
| 2012/0219790 A1 | 8/2012 | Mount |
| 2012/0288693 A1 | 11/2012 | Stanley et al. |
| 2013/0101831 A1 | 4/2013 | Knoerzer et al. |
| 2013/0101855 A1 | 4/2013 | Cham |
| 2013/0122280 A1 | 5/2013 | Yokota |

FOREIGN PATENT DOCUMENTS

| | | |
|---|---|---|
| DE | 10347015 A1 | 4/2005 |
| EP | 0058571 A1 | 8/1982 |
| EP | 0229476 A1 | 7/1987 |
| EP | 0333390 | 9/1989 |
| JP | 2000-185381 | 7/2000 |
| JP | 2003-191425 | 7/2003 |
| JP | 2003-276144 | 9/2003 |
| JP | 2004106314 A | 4/2004 |
| JP | 2004-256570 | 9/2004 |
| JP | 2004-351629 | 12/2004 |
| JP | 2007-083409 | 4/2007 |
| JP | 2011-63002 | 3/2011 |
| WO | 9601736 | 1/1996 |
| WO | 96/18544 A1 | 6/1996 |
| WO | 96/31303 | 10/1996 |
| WO | 2004-093883 A2 | 11/2004 |
| WO | 2006/029835 A1 | 3/2006 |
| WO | 2007/047133 A1 | 4/2007 |
| WO | 2012/085060 A1 | 6/2012 |

OTHER PUBLICATIONS

PCT International Search Report dated Apr. 3, 2014 from PCT Application No. PCT/US13/68512 (8 pages).

Tokiwa, Yutaka "Biodegradability of Plastics," Int. J. of Mol. Sci. Sep. 2009, 10(9)3722-3724, published online Aug. 26, 2009 (18 pages).

PCT International Search Report dated Feb. 21, 2014, from PCT Application No. PCT/US13/53478 (6 pages).

PCT International Search Report dated Feb. 21, 2014, from PCT Application No. PCT/US13/53473 (6 pages).

Machine translation of German Patent Publication No. DE10347015 A1 published on Apr. 28, 2005 (5 pages).

Machine translation of Japanese Patent Publication No. 2011/063002 A2 published on Mar. 31, 2011 (18 pages).

Kim & Chang translation of excerpt of Japanese Patent Publication No. 2011/063002 A2 published on Mar. 31, 2011 (1 page).

(56) References Cited

OTHER PUBLICATIONS

"Nanophasen-Materialen" published in Rompp Lexikon Chemie, 10. Auflage, 1998, Thieme Verlag, Stuttgart; ISBN: 3-13-734910-9; vol. 4, p. 2804 (3 pages).

PCT International Search Report dated Nov. 22, 2013, from PCT Application No. PCT/US13/47106 (7 pages).

PCT International Search Report dated Dec. 2, 2013, from PCT Application No. PCT/US13/47128 (9 pages).

Agarwal, Mukul, et al. "Characterization of the Degradation of Polylactic Acid Polymer in a Solid Substrate Environment," Biotechnol. Prog. 1998, vol. 14, pp. 517-526 (10 pages).

Devlieger, J.J., "Green plastics for food packaging," TNO Industrial Technology, Chapter 24, pp. 519-534, The Netherlands, date unknown.

Goldsberry, Clare, "The Greening of an Industry: PLA film coatings replacing thermoplastics," Modern Plastics Worldwide magazine, Feb. 2007, pp. 54 and 56, United States.

Kolybaba, M., "Biodegradable Polymers: Past, Present, and Future" The Society for Engineering in Agricultural, Food, and Biological Systems, Paper No. RRV03-00007, Oct. 2003, 15 pages.

Liu, Lillian, "Bioplastics in Food Packaging: Innovative Technologies for Biodegradable Packaging" San Jose State University Packaging Engineering, Feb. 2006, 13 pages.

Malwitz, Matthew M., et al., "Orientation of Platelets in Multilayered Nanocomposite Polymer Films," Journal of Polymer Science: Part B: Polymer Physics, vol. 41, 3237-3248 (2003) © Wiley Periodicals, Inc., United States.

NatureWorks LLC PLA Polymer 4032D "Biaxially Oriented Films—High Heat" pp. 1-3, © 2005.

NatureWorks LLC Health and Safety, "Material Safety Data Sheet" pp. 1-10, Jul. 19, 2006.

Schmitz, Peter, et al. "Films," Ullmann's Encyclopedia of Industrial Chemistry, 5th ed., vol. A11 (1988), pp. 85-110 (26 pages).

* cited by examiner

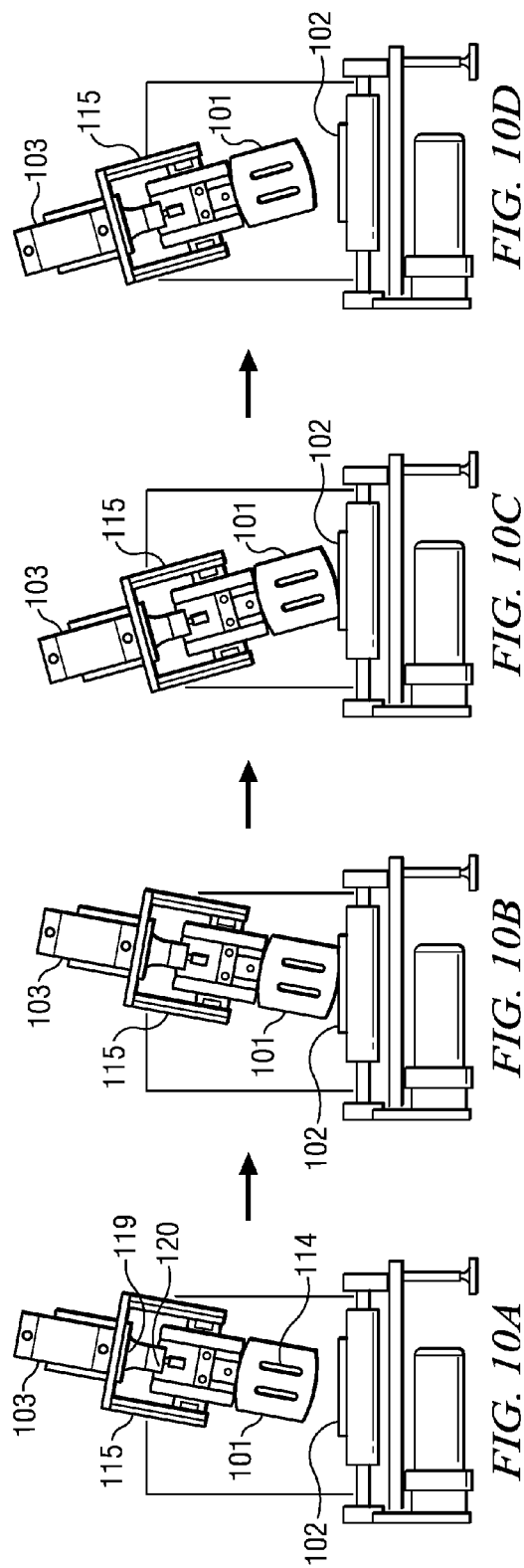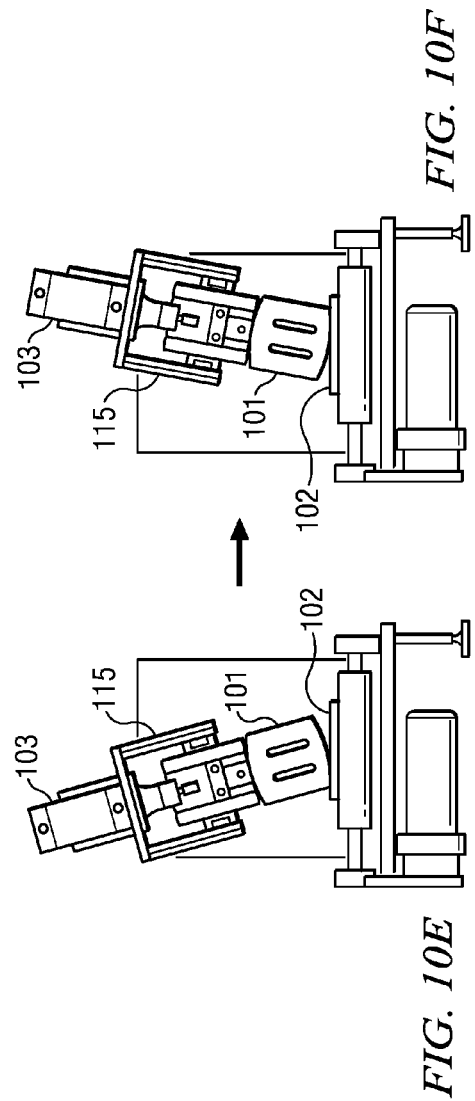

ULTRASONIC SEALING OF PACKAGES

BACKGROUND OF THE INVENTION

1. Technical Field

The present invention relates to an apparatus and method for sealing films.

2. Description of Related Art

Various materials can be sealed using ultrasonic energy. The process typically involves vibrating a horn in close proximity to an anvil. Frictional forces in the material between the horn and the anvil provide the necessary heat for sealing.

There are many disadvantages to using ultrasonic energy to seal two films. One problem is the lap seal. In many packages made of films, the seals comprise varying numbers of layers. As an example, the seal will comprise three layers at the location of the lap seal but only two layers elsewhere. If a proper amount of energy is used for the two-layer seal, then this is insufficient energy to seal at the lap seal. Likewise, if a proper amount of energy is used at the lap seal, then too much energy is applied to the seal with only two layers resulting in an inadequate seal. Consequently, it is desirable to provide a method and apparatus which can seal films having a variable number of layers.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIGS. 10A-10F illustrate perspective views of a floating horn in one embodiment.

DETAILED DESCRIPTION

Several embodiments of Applicants' invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
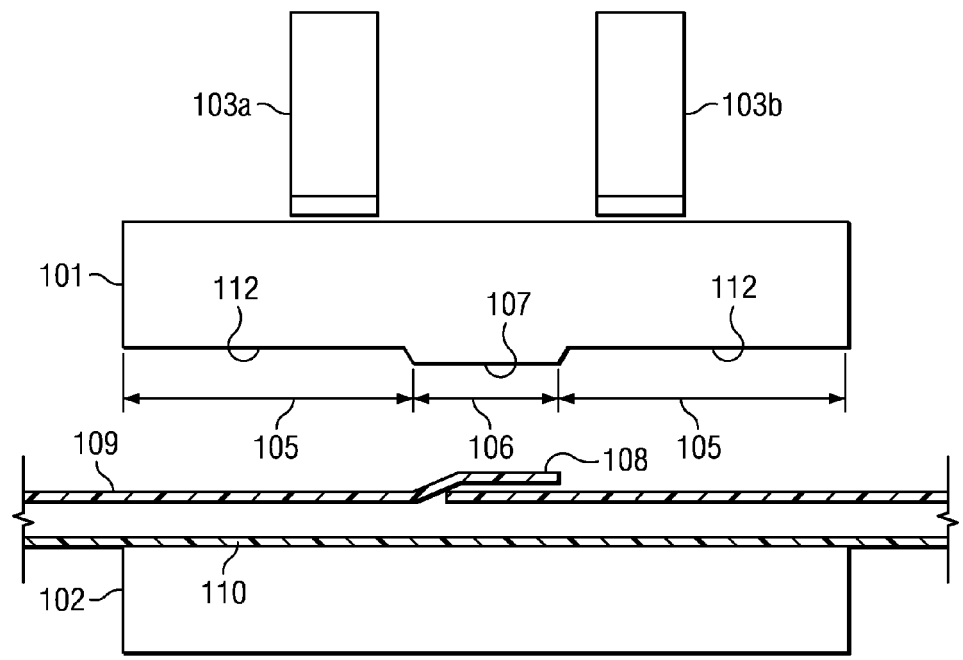
FIG. 1 illustrates a front profile view of the sealing device in one embodiment.

FIG. 1 illustrates a front profile view of the sealing device in one embodiment. As depicted the sealing device comprises a horn 101, an anvil 102, and a pair of transducers 103a, b. In one embodiment a horn 101 is a bar of metal such as titanium, aluminum, steel, and combinations thereof which is dimensioned to be resonant at a desired frequency. As will be discussed below herein, the geometry of the horn 101 can be altered to affect the resonance, and accordingly the resultant amplitude, of the horn 101.

The sealing device, in one embodiment, comprises at least one transducer 103a, b. As depicted in FIG. 1 there are two transducers but virtually any number of transducers 103a, b may be utilized. The transducers 103a, b generate ultrasonic energy in the form of high frequency, typically low amplitude mechanical vibrations. In one embodiment the transducer 103a, b operates between 15 kHz and 75 kHz. In another embodiment the transducer 103a, b operates between 25 kHz and 40 kHz. The vibratory energy supplied by the transducer is applied to the horn 101 which causes the horn 101 to vibrate. The frictional forces caused between the vibrating horn 101 and the anvil 102 produce heat which is used to seal the two work pieces together.

It should be noted that mechanical pressure is applied prior to and/or during and/or after the sealing of the work pieces to remove any interstitial air gaps between the work pieces and promote good thermal and acoustic contact. The pressure also helps to hold and help the work pieces fuse as they cool. As will be discussed in more detail below, pressure can also be used to change the energy dissipated into a work piece by applying different pressures across the weld joint so that the contact resistance varies. The pressure can be applied via servo motors, via hydraulic or pneumatic cylinders, or via any device known in the art to apply pressure. In one embodiment pressure from about 20 to about 250 psi is applied.

The anvil 102 comprises virtually any material. In one embodiment the anvil 102 comprises the same material as the horn 101. In one embodiment the anvil 102 is stationary during the sealing.

FIG. 1 illustrates an embodiment wherein the geometry of the horn 101 is altered to affect the force felt by the work piece in specified portions. As depicted the horn 101 comprises a non-uniform length and the anvil 102 comprises a uniform length. A non-uniform length refers to a horn 101 or anvil 102 which comprises at least one area of increased or decreased length relative to the remainder of the horn 102 or anvil 102. The length of the horn 101 is measured from the top of the horn 101 to the bottom of the horn 101. As depicted the horn 101 comprises a protrusion 107 which extends beyond the non-raised portion 112 of the horn 101. By extending beyond the non-raised portion 112 of the horn 101, the protrusion 107 results in increased force compared to the non-raised portion 112 of the horn 101. While the protrusion 107 has been illustrated which extends outward beyond the non-raised portion 112, in other embodiments the protrusion 107 extends inwardly. In such an embodiment, the non-raised portion 112 extends beyond the protrusion 107. Such an inward protrusion 107 accounts for the increased thickness of the seals. A protrusion 107 results in a non-uniform gain across the face of the horn 101.

Figure 2:
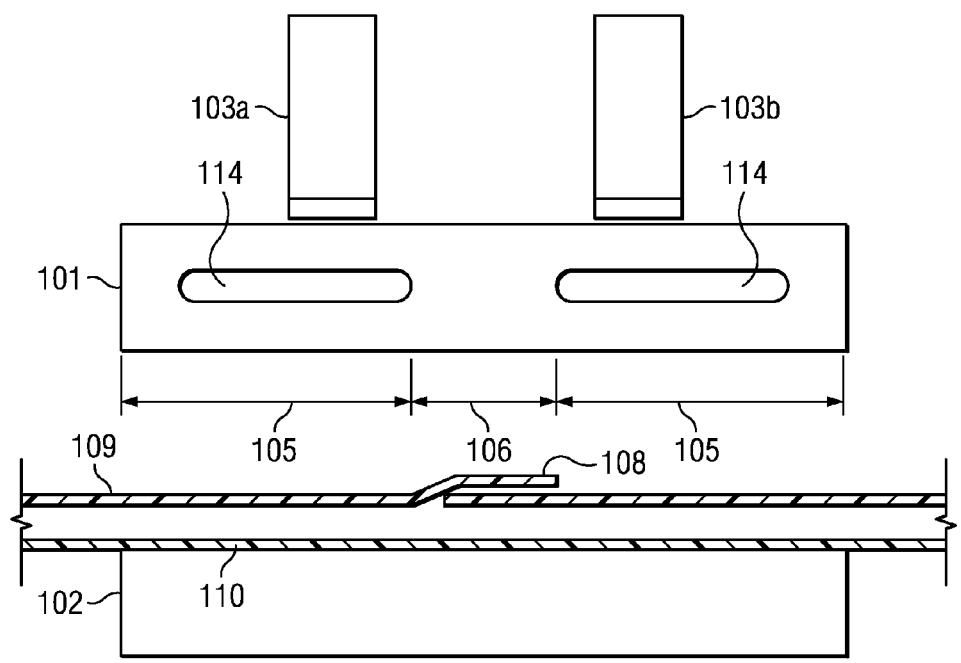
FIG. 2 illustrates a front profile view of the sealing device comprising slots in one embodiment.

FIG. 2 illustrates a front profile view of the sealing device comprising slots in one embodiment. FIG. 2 illustrates a different manner in which a non-uniform amplitude can be obtained. FIG. 2 comprises a uniform face but a non-uniform body portion. As can be seen, the horn 101 comprises slots 114 which provide for the non-uniform amplitude. Put differently, even though the horn 101 has a uniform face, the slots 114 alter the gain in the area below the slots 114, referred to as the slot portion. Accordingly, comparatively different gain is experienced in areas of the horn 101 which do not have the slots 114, the non-slotted portion. It should be noted that in some embodiments slots 114 and protrusions 107 can be simultaneously employed. Furthermore, the shape, number, thickness, etc. of the slots 114 can be adjusted to obtain the desired gain. Finally, while in one embodiment slots 114 are utilized to result in non-uniform gain across the face of the horn 101, in other embodiments slots 114 are utilized to ensure there is uniform gain across the face of the horn 101. In such embodiments the slots 114 alter the gain, but do so such that the resulting gain is uniform across the face of the horn 101.

Returning back to FIG. 1, between the horn 101 and the anvil 102 are two work pieces 109, 110 which are to be sealed. Sealing, as used herein, refers to bonding at least two work pieces together to create a seal. Virtually any work pieces which can be sealed can be utilized. In one embodiment, and as depicted in FIG. 1, the work pieces comprise packaging film. The work pieces will be described as comprising films, but this should not be deemed limiting as virtually any work piece which can be ultrasonically sealed or welded can be utilized.

In one embodiment these packaging films are formed primarily of plastics, such as polypropylene and polyethylene, but can also contain metalized films, foil, paper, or oriented films. It should be understood that while a first film and a second film are described, each film can comprise multiple layers. For example, the first film may comprise two or more layers of film and the second film may comprise two or more layers of film.

The two or more films are sealed by melting or softening at least one film or coating so that it bonds with at least one adjacent layer. As discussed, the vibrations generate frictional heat which raises the local temperature of at least one film above its melting or softening temperature. As previously discussed, the film is heated such that it bonds rather than cuts the seal which could result in an inadequate seal.

As depicted the top film 109 further comprises a lap seal 108. It should be noted that in other embodiments the bottom film 110 will comprise a lap seal 108. Further, while a lap seal 108 is discussed this should not be deemed limiting. Any such seal or other scenario which results in a varied number of layers across a seal or increased thickness can be utilized. Furthermore, the lap seal 108 need not already be sealed. In one embodiment the lap seal 108 is previously sealed, whereas in other embodiments the lap seal 108 comprises an overlap of layers.

As can be seen, the lap seal 108 results in an increased number of layers and an increased thickness. The portion of films having increased layers or thickness is referred to as the increased portion 106. The portion of the films having the standard number of layers is referred to as the standard portion 105. As depicted the standard portion 105 comprises two layers whereas the increased portion 106 comprises three layers. In other embodiments the increased portion 106 comprises three or more layers. Likewise, the standard portion 105 comprises two or more layers. In one embodiment, the increased portion 106 comprises at least one additional layer compared to the standard portion 105. In other embodiments, the increased portion 106 comprises the same number of layers as the standard portion but has an increased thickness compared to the standard portion 105. A film which comprises an increased portion 106 and a standard portion 105 is referred to as a variable layered film. In one embodiment, a variable layered film comprises a standard portion 105 and an increased portion 106, whereby the increased portion 106 has at least one additional layer compared to the standard portion. In another embodiment, a variable layered film comprises a standard portion 105 and an increased portion 106, whereby the increased portion 106 has an increased thickness compared to the standard portion 105. The thickness may result from a variety of reasons including an increased thickness of one of the layers.

As noted the protrusion results in more force being applied to the increased portion 106. This provides sufficient energy to seal the films at the increased portion 106. Simultaneously, the non-raised portion 112 of the horn 101 provides sufficient force to seal the films at the standard portion 105. In one embodiment the protrusion 107 is as wide as the lap seal 106. In one embodiment the protrusion extends from about 2 μm to greater than 5 mm beyond the face of the horn 101.

FIG. 1 shows a horn comprising only a single protrusion 107. It should be understood that in other embodiments the horn 101 comprises multiple protrusions 107.

In one embodiment the anvil 102 remains stationary whereas the horn 101 is lowered during sealing. Thus, in one embodiment the horn 101 is vertically moveable relative to the anvil 102. In another embodiment, the horn 101 is stationary whereas the anvil 102 is lowered during sealing. As disclosed above, downward pressure applied by the horn 101 and/or anvil 102 promotes sealing. After a specified time, the horn 101 is lifted. In one embodiment the desired seal time is as short as possible which allows for more throughput. The times vary according to pressure and gain, but times as low as about 0.15 to about 0.55 seconds per seal time have been achieved.

In one embodiment the horn 101 and/or the anvil 102 also comprises a cutting device such as a knife or blade which severs the film before, after, or during sealing. In one embodiment the horn 101 and/or the anvil 102 is knurled. It should be noted, that the knurled design can also affect the gain as well as the localized contact force across a seal. Many of the same principles which were responsible for the varied gain across a non-uniform horn 101 also apply to a knurled design. Accordingly, in one embodiment the knurl height and spacing are used to impact the localized contact force.

In one embodiment the system comprises sensors to monitor the velocity of the film and other such processing variables. If, for example, the velocity of the film changes, other processing variables are adjusted to maintain the desired applied energy. For example, the amplitude of the horn 101 or the force applied to the horn 101 can be adjusted to maintain the desired energy application even in light of other processing changes.

Virtually any sensor and control system can be used to monitor the velocity and status of the film. One embodiment utilizes a tachometer to receive films. In another embodiment an encoder is utilized. The encoder is generally faster than a tachometer, and accordingly offers better real-time information and better control. In one embodiment, direct output from motor controllers is monitored and controlled to vary the sealing conditions.

In one embodiment a mechanical hard stop is used to prevent the hard contact between the horn 101 and the anvil 102. When such a mechanical stop is engaged the mechanical stop defines the closest distance between the horn and the anvil. In one embodiment this distance is preset according to the film thickness. A mechanical stop thus prevents burn through which results from too much ultrasonic energy. The mechanical stop comprises any mechanical device which limits the distance between the horn 101 and the anvil 102.

Figure 3:
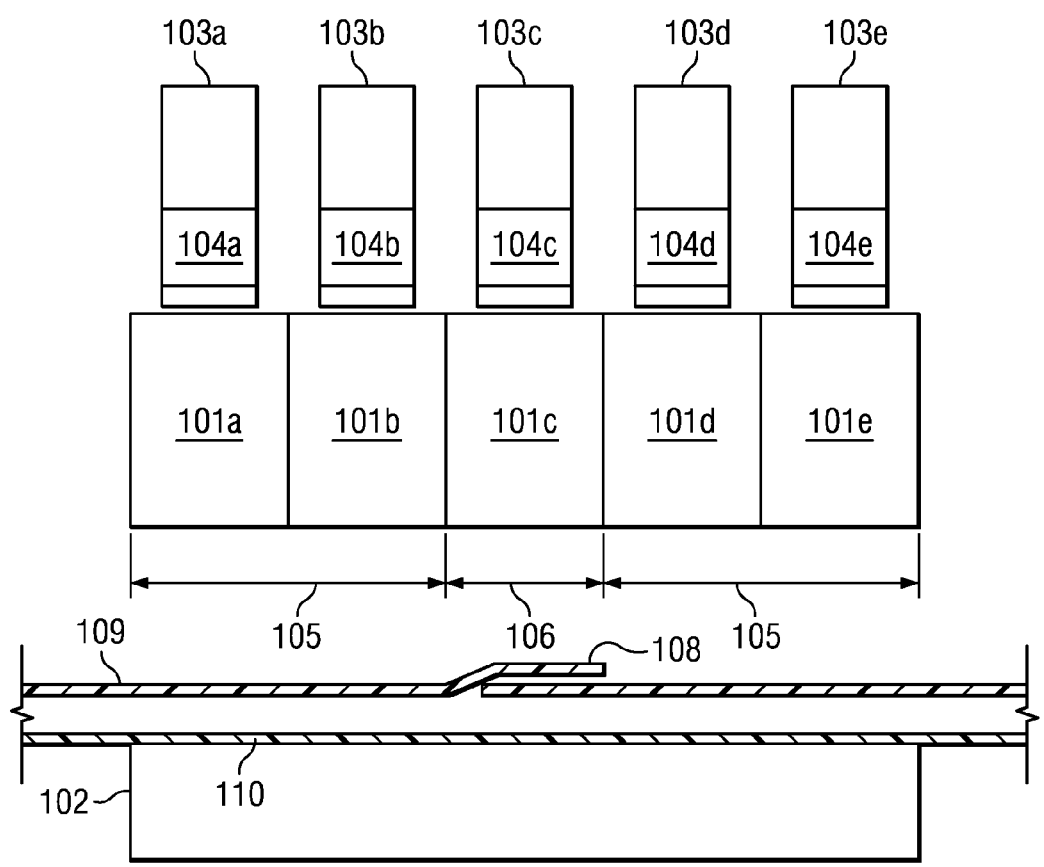
FIG. 3 illustrates a front profile view of the sealing device comprising a plurality of horns in one embodiment.

FIG. 3 illustrates a front profile view of the sealing device comprising a plurality of horns in one embodiment. Utilizing multiple horns allows the energy felt by the work piece to be independently adjusted.

As depicted in FIG. 3 there are five horns 101a-e. Virtually any number of horns can be utilized. As seen, the third horn 101c is located above the lap seal 108. The energy provided to the third horn 101c is adjusted accordingly to provide sufficient energy to seal the three layers in the increased portion 106. Accordingly, in one embodiment the horn located above the increased portion 106 applies increased energy compared to the horn or horns located above the standard portion 105.

In one embodiment at least one of the horns 101 comprises a uniform length. In other embodiments at least one of the horns 101 comprises a non-uniform length. As depicted, each horn has its own transducer 103a-e. Thus, the third horn 101c utilizes the third transducer 103c. In other embodiments, one or more horns share a transducer. For example, the horns which form the seal in the standard portion 105 share one transducer whereas the third horn 101c utilizes an independent transducer 103c. Such an arrangement provides increased cost savings as less equipment is required for operation.

In one embodiment the horn which forms the seal in the increased portion 106 shares its transducer with a horn which forms the standard portion 105. In such an embodiment the horns which form the standard portion 105 of the seal retract or otherwise disable while the horn which forms the increased portion 106 remains active. This method allows increased energy to be applied to the increased portion 106 compared to the standard portion 105. In one such embodiment the sonication time of the horn 101 which forms the increased portion 106 is greater than the sonication time of the horn which forms the standard portion 105. The sonication time refers to the amount of time that the horn 101 is spent in the sealing position relative to the anvil 102 while being supplied energy. When the horn 101 is in the sealing position relative to the anvil 102 and is being supplied energy, the horn 101 is said to be engaged.

In another embodiment one or more horns comprise a booster 104a-e. A booster is a device located between the transducer 103 and the horn 101 which mechanically amplifies the amplitude provided by the transducer 103. In one embodiment this amplification is based on the ratios of mass moments of inertia about the center node of the booster. Accordingly, as seen in FIG. 3, the third booster 104c can result in a higher amplitude being applied to the third horn 101c. The third booster 104c can be mechanically swapped with a different booster to result in decreased amplitude. As can be appreciated the boosters provide increased flexibility.

There are several benefits for using multiple horns. First is increased flexibility. If, for example, a more narrow package was being sealed, then the outer horns 101a, 101e can be disabled. This results in energy cost savings as well as energy conservation. Likewise, if a different package required that the increased portion 106 be located under the fourth horn 101d, for example, then the fourth transducer 103d can be adjusted to provide the required energy. This reduces downtime as varying packages with varying designs can be sealed using the sealing device without replacing or otherwise swapping hardware. Accordingly, a single sealing device can be utilized for many different package sizes.

Figure 4:
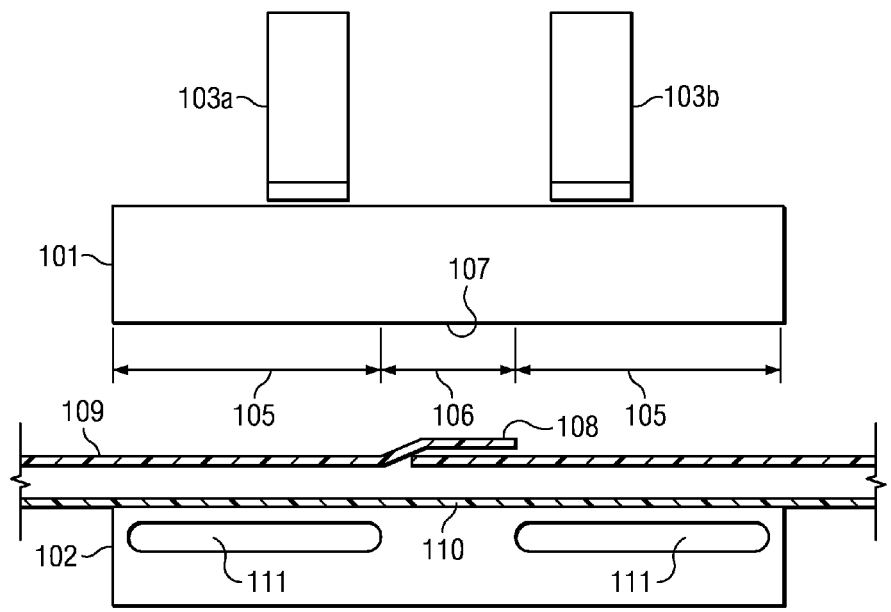
FIG. 4 illustrates a front profile view of the sealing device comprising cooling channels in one embodiment.

FIG. 4 illustrates a front profile view of the sealing device comprising cooling channels in one embodiment. As depicted the anvil 102 comprises cooling channels 111 located beneath the standard portion 105. A cooling channel 111 is any channel through which cooling fluid such as water, air, oil, etc. flows to remove heat. In one embodiment the cooling channel 111 comprises at least one micro channel machined into the anvil. In operation the presence of a cooling channel 111 allows heat to be removed below the standard portion 105. Consequently, a uniform amplitude can be applied across the horn and yet the cooling channel 111 will prevent the seal within the standard portion 105 from overheating.

In another embodiment the cooling channel 111 is replaced and/or supplemented with an anvil 102 which comprises materials with dissimilar thermal diffusivity. An anvil which comprises dissimilar thermal diffusivity is an anvil which comprises a first thermal diffusivity in the standard portion 105 and a second thermal diffusivity in the increased portion 106. As an example in one embodiment the anvil comprises stainless steel in the increased portion 106 whereas the standard portion 105 comprises copper or aluminum. In such an embodiment because the standard portion 105 comprises a material with increased thermal diffusivity, these areas will dissipate heat more quickly compared to the increased portion 106. Consequently, a uniform amplitude can be applied uniformly across the horn 101 and yet the heat applied to the standard portion 105 will be quickly dissipated to prevent the seal within the standard portion 105 from overheating. In one embodiment the difference in diffusivities are similar to the difference in energy required to seal. In one embodiment the first and/or second thermal diffusivity is achieved via cladding. In another embodiment the second thermal conductivity of the anvil in the standard portion 105 is achieved via a thermo electric cooling material. For example, a thermal electric cooler passes electrical voltage to cool a surface and displaces the heat on the hot side. The standard area anvil comprises a thermal electric cooler which keeps material cool and discharges hot air to the hot side of the thermal electric cooler. It should be noted that cooling channels 111 and the thermal electric cooler can also be located in the horn 101.

While a sealing device has been described, a method of sealing films will now be discussed. In one embodiment, the first step is feeding at least two work pieces between a horn 101 and an anvil 102. The at least two work pieces comprise a standard portion 105 and an increased portion 106. As noted above, the increased portion 106 comprises at least one additional layer or increased thickness compared to the standard portion 105, thus, in one embodiment the work pieces comprises a variable layered work piece. In one embodiment the work pieces comprise films. Films may also have different polymer and metalized structures as well as number of layers.

Next the two work pieces are sealed together. The seal depends upon several factors including force, amplitude, the properties of the work pieces, energy provided by the transducer, and the sonication time. These variables can be adjusted to yield a desired seal. The energy felt on a portion of the work piece is a function of these variables. In one embodiment the sealing step comprises i) providing a force so that a first energy is felt on said standard portion to seal the standard portion, and ii) providing a force so that a second energy is felt on the increased portion to seal the increased portion. In one embodiment the first energy is dissimilar from said second energy. In one embodiment the first energy is lower than the second energy. In one embodiment both the first and second energy comprises sufficient energy to seal the layers without undesirably melting the layers and without underwelding. Undesirably melting is a melting which results in holes in the seal and thus provides an unsatisfactory seal. This is caused by excessive heat generation resulting from aggressive sealing conditions. Underwelding results in a seal which does not pass the leak and peel strength requirements which are necessary to create a full hermetic seal.

The step of providing a force so that different energies are felt upon, or dissipated within, the films can be accomplished with any method discussed herein. For example, in one embodiment, referring to FIG. 1, the non-raised portion 112 results in the first energy whereas the protrusion 107 results in the second energy. In another example, referring to FIG. 2, the portion below the slots 114, the slot portion, results in the first energy whereas the non-slotted portion results in the second energy. In another embodiment, referring to FIG. 3, the third transducer 101c provides energy to result in a second energy being felt by the increased portion 106 whereas the second 101b and fourth transducer 101d provides energy to result in a first energy being felt by the standard portion 105. As noted, FIG. 3 is for illustrative purposes only, and the invention is not limited to embodiments with five transducers.

As noted above and still referring to FIG. 3, in one embodiment the horn 101c above the increased portion 106, shares its transducer with horns 101a, b, d, e located above the standard portion 105. In such an embodiment the increased energy can be provided by utilizing a booster. In other embodiments the increased energy can be provided by increasing the weld time of the horn 101c above the increased portion 106.

Figure 5:
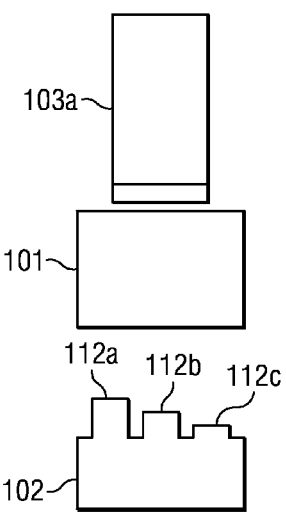
FIG. 5 illustrates a side profile view of a sealing device comprising features in one embodiment.

The strength, size, and shape of the seal can be controlled with the geometry of the horn and/or anvil. FIG. 5 illustrates a side profile view of a sealing device in one embodiment comprising features. The features 112 are teeth-like features which extend beyond the face of the anvil 102. Features 112 are used to provide a seal with multiple parallel seals. For example, three parallel seals will be created at the location of each feature 112a, b, c. The design of the feature 112 affects the peel strength of the formed seal. In one embodiment the resulting seal comprises a peel strength of 700 grams per inch to about 1100 grams per inch or higher. The inside of the package can be located on either the left or right side of the anvil 102 as depicted.

Applicants have discovered that consumers of potato chips and other goods in a flexible package have come to expect a certain peel strength for a flexible package. Some consumers even question if a bag was successfully sealed if the bag opens unexpectedly easily. Typically, the first seal exhibits a larger peel strength, and once that bond is broken the remaining seals exhibit comparatively smaller peel strengths. Applicants have discovered that the peel strength can be easily varied utilizing sonic sealing, and that the peel strengths expected by the consumers can be obtained and reproduced using sealing.

The peel strength can be varied by a variety of factors including frequency, sonication time, and pressure. Additionally, the peel strength profile can be varied over seal width by the feature 112 design. Referring back to FIG. 5, the peel strength can be adjusted by adjusting the height of each feature 112 as well as the spacing between adjacent features. Thus, if the goal is to set a first peel strength to break a first seal, then the height of the first seal corresponding to the first feature 112a is adjusted. Thereafter, if the goal is for the peel strength required to open the remainder of the package to decrease, then the height and spacing of the remaining features 112b, c is adjusted accordingly.

Figure 6:
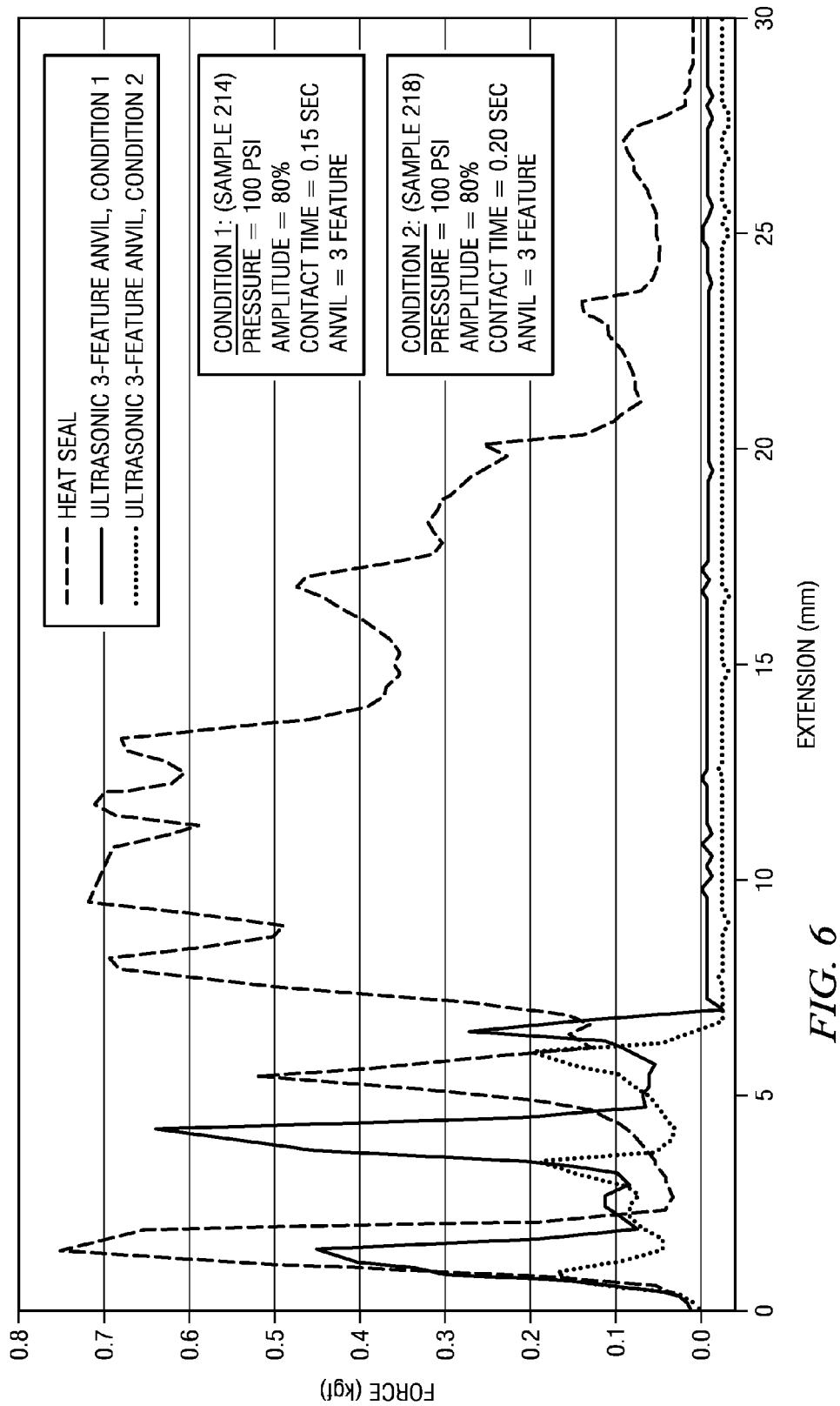
FIG. 6 illustrates a graph showing the peel data for various embodiments.

FIG. 6 depicts a graph showing the peel data for various embodiments. As can be seen the peel force is measured against extension. The control illustrates the peel force for a prior art potato bag made with conventional heat sealing methods. The other graphs show the peel force at difference parameters. As seen, changing the contact time, or sonication time, led to an increase in peel strength. As noted above, the number of features, pressure, amplitude, sonication time, as well as other parameters can be adjusted to mimic the desired peel strength.

Figure 7:
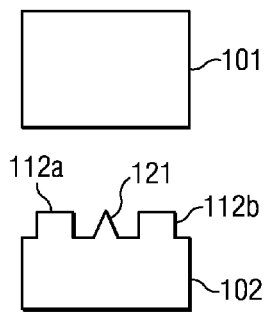
FIG. 7 illustrates a side profile view of a sealing device comprising cutting features in one embodiment.

FIG. 7 illustrates a side profile view of a sealing device comprising a cutting feature in one embodiment. A cutting feature 121 is a feature which concentrates the force, pressure, and accordingly, the energy at a point resulting in an overweld at a desired location. Rather than simply sealing or welding the material, the material is cut at the location of the cutting feature 121.

FIG. 7 shows the cutting feature 121 between two adjacent features 112a, b. In one such embodiment a single anvil 102 creates two seals for different packages. For example, in one embodiment, the left feature 112a seals the bottom seal of an upstream package while the right feature 112b simultaneously seals the top seal of a downstream package on a vertical form, fill, and seal machine. In such an embodiment, while the seals are being made, simultaneously the upstream and downstream packages are severed with the cutting feature 121. This provides for the elimination of separate cutting equipment such as a knife. Further, this allows the sealing and cutting to take place simultaneously and with the same equipment.

The height and geometry of the cutting feature 121 varies. In one embodiment the cutting feature 121 is in the same vertical plane as the adjacent features 112, meaning they are of equal height, but its geometry is that of a point which concentrates force and pressure resulting in a cut. In other embodiments, the cutting feature 121 has a greater height than non-cutting features 112. In one such embodiment the horn 101 comprises a recessed portion which can receive the elevated cutting feature 121.

While the cutting feature 121 has been discussed with reference to cutting, in other embodiments a perforation results. For example, if the height of the cutting feature 121 is constant along its length so as to form a continuous ridge, this can result in a cut. However, if the height varies along the length as to form a series of peaks, this results in perforations. The size of the perforations will depend upon the shape of the cutting feature 121.

As shown above, features 112, 121 provide for sealing and cutting. However, the features 112 may be adjusted to provide a variety of benefits. For example, while the features 112 discussed have resulted in a line seal, in other embodiments a different shape of seals are obtained. For example, rather than a line, the seal is in the shape of a logo or other geometric shape such as a letter, number, or symbol. The seal can be wavy, circular, state a message, etc. The shape, height, and orientation of the features 112 can be adjusted to obtain the desired seal shape. A feature which provides a seal 121 with a shape which varies along its length is referred to as a unique feature.

Figure 8:
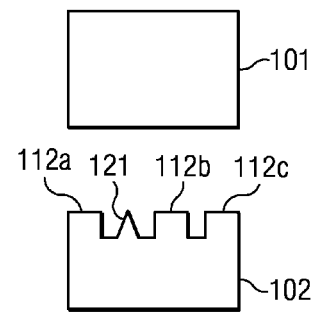
FIG. 8 illustrates a side profile view of a sealing device comprising features in one embodiment.

Another example is a cut-out. Packages often are often displayed by being hung through a single wire which extends through a cut-out in the package. In one embodiment, a feature 112 is modified to result in a cut-out. The cut-out can be located above or within the seal. For example, FIG. 8 illustrates a side profile view of a sealing device comprising a cutting feature and a cut-out feature in one embodiment. FIG. 8 is similar to FIG. 7 in that two packages are sealed simultaneously. The bottom seal of an upstream package is made with the left feature 112a. The top seal for a downstream package is made on the far right feature 112c. The two packages are cut from one another with a cutting feature 121. Between the cutting feature 121 and the far right feature 112c is the cut-out feature 112b. In such an embodiment, the cut-out is located above the top seal on the downstream package.

The cut-out feature 112 can be modified as explained above to result in a cut-out. In one embodiment the material within the cut-out is removed whereas in other embodiment the cut-out is perforated such that a wire hanger may be subsequently inserted for hanging.

Figure 9:
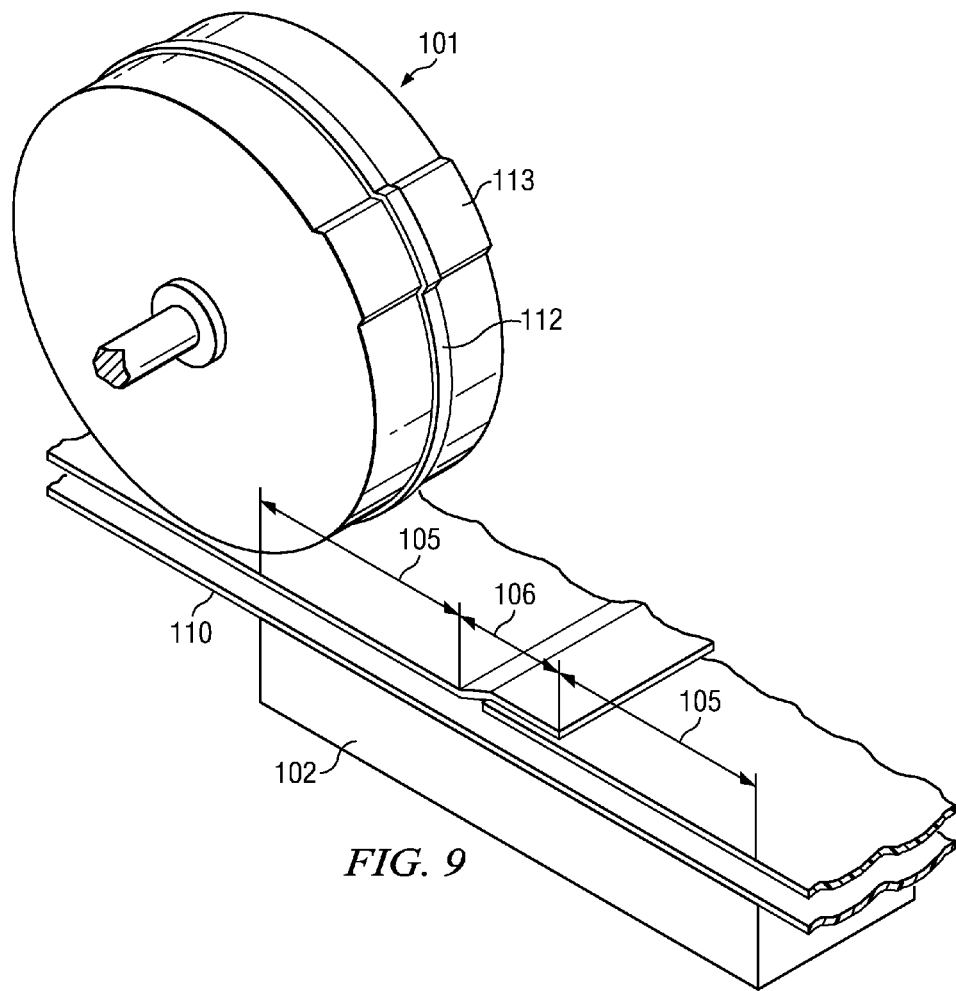
FIG. 9 illustrates a perspective view of a sealing device comprising a rotary horn in one embodiment.

While in some embodiments a relatively rigid anvil 102 is utilized, in other embodiments a compliant anvil 102 is utilized. A compliant anvil 102 is an anvil which bends or otherwise complies to provide equal force along the sealing area. With a rigid anvil 102, the anvil can experience pockets of increased localized force. A compliant anvil 102 bends or complies to equalize the force along the sealing area. A compliant anvil 102 can be achieved in a variety of ways. One example is an anvil which comprises slots of removed material along the face of the anvil 102. These slots allow the anvil 102 to comply under varying loads across the face of the anvil 102. Another example is an anvil 102 which comprises compliant material. In one embodiment, a compliant anvil 102 reduces the dependency of horn 101 and anvil 102 alignment which is often required to achieve repeatability with high speed sealing of very thin films. One embodiment utilizes a thicker, transition joint to control the energy dissipation and minimize overheating Thus far, sealing has been described in reference to a substantially planar horn 101 and anvil 102. In other embodiments a non-planar horn 101 and/or anvil 102 are utilized. FIG. 9 depicts a perspective view of a rotary horn. As depicted, the horn 101 comprises a rotary horn 101 which both rotates and ultrasonically vibrates over the stationary anvil 102. In one other embodiments the horn 101 is stationary and a rotary anvil 102 rotates. As noted above, in one embodiment the system comprises sensors to monitor the velocity of the film and other such processing variables. If, for example, the velocity of the film changes, the horn 101 and the anvil 102 can be adjusted to maintain the desired applied energy. For example, the rotation of the horn 101 can be adjusted, as can the movement of the anvil 102 and/or the horn 101. Likewise, the amplitude of the horn 101 can also be adjusted to maintain the desired energy application even in light of other processing changes.

In one embodiment when the horn 101 is in its position to seal the increased portion 106, the sonication time is increased relative to the sonication time at the standard portion 105. The sonication time can be adjusted in a variety of ways. For example, in one embodiment the rotation of the rotary horn 101 slows during the sealing of the increased portion 106. Slowing the rotation of the rotary horn 101 allows additional energy to be applied to the increased portion 106. In another embodiment the amplitude of the rotary horn is adjusted to provide the increased energy to the increased portion 106. This can be accomplished with any method previously discussed including a non-uniform length which includes slots and protrusions. As depicted the horn 101 comprises a protrusion 113 which results in increased force.

There are a variety of rotary horns 101 which can be utilized. These include radial displacement horns whereby the maximum amplitude is located at the outer diameter and axial displacement horns whereby the axial displacement shears the film.

As previously discussed, pressure and force have an effect on the seal. There are a variety of ways to alter the pressure applied by the horn. FIGS. 10A-10E are a side profile of a sequence of a sealing device with a floating horn. A floating horn is a horn 101 which moves about relative to the anvil 102 and which intermittently engages the anvil 102. While a floating horn will be discussed it should be noted that other embodiments utilize a floating anvil 102 with a stationary horn 101.

As depicted in FIG. 10A, the horn 101 is attached to a support 115. The support 115 supports and adjusts the floating horn 101 as desired. The support 115 also couples the floating horn 101 to the transducer 103. The support 115 comprises any apparatus known in the art which is used to support and maneuver including actuators, robotic arms, etc. In one embodiment, the support 115 controls the pressure applied to the floating horn 101.

As depicted, the floating horn 101 comprises a curved face. The face is the portion of the horn 101 which faces the anvil 102. The embodiment depicted in FIGS. 10A-10E allows focused energy input to very small areas by rotating the horn face across an arc circle. As discussed, the energy input can be altered on variances in material thickness to achieve uniform sealing for multi-ply structure.

In FIG. 10A, the horn 101 is raised relative to the anvil 102. In FIG. 10B, the horn 101 is lowered into sealing position relative to the anvil 102. Energy is applied to the horn 101 via a transducer 103. Additional pressure can be applied with the support 115 which can apply pressure to the horn 101 via any method previously discussed.

As depicted, the horn 101 approaches the anvil 102 at an angle. Thus, the horn 101 is slanted in a first direction relative to the horn. As depicted, the horn 101 is slanted to the right. Because of the angle, a reduced area of the horn 101 is in close proximity to the anvil 102. This, in turn, concentrates the pressure applied via the horn 101.

From FIG. 10B to FIG. 10C, the horn is rotated from the right to the left creating the desired seal. Thus, the horn 101 is rotated in a second direction, left as depicted, which is opposite to the first direction, right as depicted. In FIG. 10D, the seal is complete and the horn 101 retracts so as to disengage from the anvil. Thereafter, the sealed film is removed and an unsealed material is inserted and the process repeats itself.

In one embodiment wherein the horn 101 is used on a vertical form, fill, and seal machine, after sealing the film is pulled downward by drive belts and a new seal is subsequently created. In such an embodiment the floating seal operates in a stop and go sealing method as a first seal is created, film is advanced, and then a second seal is created.

In one embodiment, to decrease time required for the floating horn 101 to reset, once the seal is created the horn 101 now seals in the opposite direction it had previously sealed. Thus, FIGS. 10A through 10C demonstrate a sealing sequence wherein the material is sealed from right to left. After the material is sealed, in one embodiment, the sequence reverses and seals from left to right. Such an embodiment eliminates the time necessary for the horn 101 to reset and pivot back to the position shown in FIG. 10A. Thus, such an embodiment allows the machines to seal in comparatively less time.

In one embodiment the floating horn 101 is a non-uniform horn and results in non-uniform amplitudes. Any method discussed herein can be utilized to result in an area of varied energy including a non-uniform horn, a horn with a protrusion, etc. As depicted, the horns 101 comprise slots 114 but this method is not so limited.

In one embodiment the horn 101 offers uniform amplitude. A horn 101 providing uniform amplitude provides great flexibility in that it can be used for variable seal widths. Because of the uniformity of amplitude, a user can change the size of the desired seal without necessitating a change in the horn 101 and/or anvil 102. For example, if a uniform amplitude is utilized, the same horn 101 and anvil 102 can be used to create a seal width of 5 inches, a seal width of 10 inches, and a seal width of 13 inches. This results in increased flexibility and decreased downtime when changing bag sizes. The uniform amplitude can be achieved by modifying the geometry, shape, etc. of the horn 101. In one embodiment, slots 114 are utilized to ensure a uniform amplitude.

In one embodiment the support comprises at least one axis of rotation 119, 120. As depicted, and in one embodiment, the support comprises two axes of rotation 119, 120. Having two axes of rotation 119, 120 allow the face of the floating horn 101 to more freely rotate about the curved face of the floating horn 101. Put differently, two axes of rotation 119, 120 allow the curved face of the horn 101 to rotate across the anvil 102 without dragging. Two axes of rotation 119, 120 also allow for the creation of larger seals compared to a single axis of rotation. In one embodiment the two axes of rotation 119, 120 provide a point of rotation about a horizontal plane. In one embodiment the two axes of rotation 119, 120 are vertically aligned so that the first axis of rotation 119 is located above a second axis of rotation 120.

In one embodiment the floating horn 101 is used to create an end seal on a package. In one embodiment the floating horn 101 is used on a vertical form, fill, and seal machine.

The horns 101 can be operated with any control system known in the art or described herein. For example, in one embodiment of a floating horn 101, a proportional valve or pilot operated control system self regulates the seal pressure when in the increased layer portion. Further, in one embodiment, a control system which regulates seal force as a function of collapse height of the work piece is utilized.

Figure 11A:
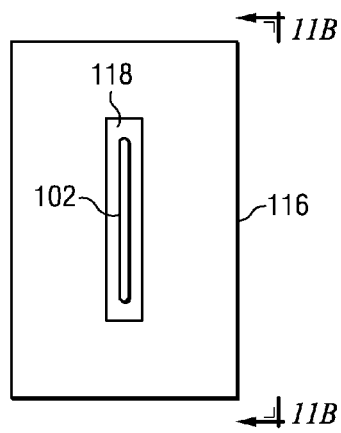
FIG. 11A illustrates a top view of an integrated anvil in one embodiment.

In one embodiment, the anvil 102 and/or horn 101 can also be integrated into the packaging equipment. As an example, FIG. 11A depicts a top view of an integrated anvil in one embodiment. As depicted the anvil 102 is integrated into the former 116 although an anvil 102 can be integrated into other types of equipment as well. As depicted, the anvil 102 is affixed to a base 118 such that it sits on top of the former. In one embodiment the integrated anvil 102 comprises a removable piece which installs on the outside of the former 116. This allows the integrated anvil 102 to be easily exchanged allowing for the use of different seal patterns, features, radius of curvature, etc. to be used on the same former 116. By having the integrated anvil 102 being located and installed on the outside of the former 116, product flow through the former is not interrupted, slowed, or stopped which could otherwise happen if equipment jetted into the inside of the former 116. In one embodiment the inside of the former 116, the side through which product flows, is not altered. This can be accomplished in a variety of ways. In one embodiment the former 116 comprises two concentric layers: an inner layer and an outer layer. The outer layer comprises the anvil 102 and the inner layer is unaltered. In still another embodiment the outside layer of the former 116 comprises a recess in which the horn 102 is mounted while in still other embodiments the horn 102 simply affixes to external surface of the former 116. It should again be noted that while the former 116 is addressed, the anvil 102 and/or horn 101 can be installed in virtually any type of equipment.

In one embodiment the former tube which houses the integrated anvil 102 comprises a thicker material compared to prior art formers. This increased thickness provides mounting devices, such as screws or the like, to mount the integrated anvil 102 onto the former without altering the inner diameter through which product flows. The increased thickness also provides for decreased resonance and flexing of the tube. For example, when pressure is applied to create the seal, the increased thickness of the former provides the necessary backing strength to make a sufficient seal.

In one embodiment the anvil 102 is attached magnetically to the former. Such an embodiment eliminates the mounting device otherwise required to mount the anvil to the former. Thus, in some embodiments, a thinner former can be used compared to a former which requires sufficient thickness to provide for mounting screws, nails, or the like.

In another embodiment either the anvil 102 and/or horn 101 are magnetic, and the force between the horn 101 and anvil 102 comprises a magnetic force. This magnetic force can be controlled and adjusted by modifying the current. The magnetic force provides tension upon the film to prevent slippage and misalignment.

Figure 11B:
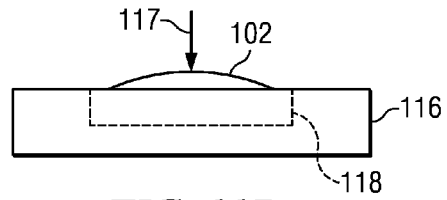
FIG. 11B illustrates a side profile view of the anvil depicted in FIG. 11A.

As noted the pressure and geometry of the horn 101 and anvil 102 can be adjusted to control peel strength. One embodiment utilizes a curved horn 101 and/or anvil 102 profile. FIG. 11B is a side profile view of the anvil depicted in FIG. 11A. As depicted the base 118 fits within the recessed portion of the former 116. As depicted the anvil 102 comprises a curved profile whereby the anvil 102 is curved along its major axis. The sealing can take place at a variety of points, but in one embodiment the sealing takes place at the high point 117. At the high point 117 the distance between the anvil 102 and the horn 101 as well as the film thickness is such that the ultrasonic energy can create a seal.

In one embodiment the integrated anvil 102 is used to create a back seal on a package. A back seal is the seal which often extends along the length of the package and is oriented approximately perpendicular to the top and bottom end seals. In such an embodiment, the film is wrapped around the former 116 to create a tube. Thereafter, the tube is sealed by the creation of a back seal. The package is complete upon the completion of the end seals which in some embodiments are transverse to the back seal.

In one embodiment wherein the back seal is created with an integrated anvil 102, the integrated anvil 102 acts similar to a sewing machine. As film is advanced over the anvil 102, the film is sealed when it crosses the high point 117. As previously noted, in some embodiments the horn 101 and/or anvil 102 are coupled with sensors or the like to stop and start as required. Thus, for example, if the film stops to allow for the end seals to be made the horn 101 and/or anvil 102 can disengage so as to not burn or melt the film above the high point 117. In one embodiment the horn 101 and anvil 102 do not physically separate when the film is stopped. Thus, the distance between the horn 101 and anvil 102 does not change. Instead, the horn 101 is disengaged so as to not vibrate when prompted by the sensors, timers, etc. In one embodiment, the back seals are created at a rate of greater than 2,000 inches per minute. In another embodiment the back seals are created at a rate of between 200 and 800 inches per minute.

In another embodiment, the horn 101 and/or anvil 102 comprise a curved profile along its width or minor axis. Thus, the cross-section of the anvil 102, for example, when viewed parallel to the major axis, is curved. Anvils 102 with a different radius of curvature can be selected to control the sealing performance. An increased radius results in a flatter surface which provides more sealing surface. The curvature ensures that point contact is made with the anvil 102 or horn 101. Such point contact prevents cutting compared to a flat or non-curved profile.

In another embodiment, the anvil 102 comprises a rotating anvil 102 which rotates as opposed to being stationary as previously described. A rotating anvil 102 comprises a high point 117 at which the seal is created. By rotating, the friction upon the film is reduced. Further, a rotating anvil 102 allow for the use of features of differing patterns or shapes such that the back seal has varying patterns or symbols along its length.

Taken further, in another embodiment the rotating anvil 102 comprises a rotating belt. The belt comprises features which are used to create a seal in the desired shape and with the desired patterns and symbols. A belt allows the incorporation of longer symbols or messages compared to a rotating anvil.

As discussed above, in one embodiment ultrasonic sealing is used to create a back seal. In another embodiment ultrasonic sealing is used to create end seals. In still another embodiment, ultrasonic sealing is used to create both the back seal and the end seals. One such embodiment takes place on a vertical form, fill, and seal machine although other bagmakers such as horizontal form, fill, and seal machines can be utilized. In one embodiment a pillow pouch package used to store snacks such as potato chips is manufactured using ultrasonic seals. In one embodiment, the first step is feeding a film into the bagmaker. In one embodiment, the film is fed to the outside of a former whereby the film is formed into a tube. As noted previously, in one embodiment, the film comprises a variable layered film. Next, a back seal is created resulting in a sealed tube. As noted, in one embodiment the back seal is created by inserting the film to be sealed between a horn 101 and an anvil 102 comprising a high point 117, and sealing the film at the high point 117 of the anvil 102.

After creating a sealed tube, the tube is pulled downward and a first ultrasonic end seal is formed to create a partially formed package. Any method or device discussed herein can be used to create the end seal. In one embodiment, a floating horn 101 creates the ultrasonic end seal. In one embodiment the end seal is perpendicular to the back seal. Thereafter, product is dropped into the partially filled package.

The partially filled package is then pulled downward with belts or other devices known in the art, and the second ultrasonic end seal is formed creating a sealed package. The second ultrasonic end seal can be formed with any method or device discussed herein. In one embodiment the first and second ultrasonic end seals are formed with the same horn 101 and anvil 102.

The sealed package is then cut from the remaining film. This can take place with a knife or other cutting devices known in the art. In one embodiment, the cutting utilizes a cutting feature 121 previously described. Accordingly, in one embodiment the cutting takes place simultaneously with the forming of the second end seal.

In one embodiment, the back seal is formed via continuous sealing whereas the end seals are created with stop and go sealing. Further, in one embodiment the end seals, due to the presence of the back seal, utilize variable layered film, whereas the back seals do not.

As discussed, in one embodiment, packaging films such as such as polypropylene and polyethylene are utilized. In another embodiment, non-melting film material which comprises a coating is utilized. The coating is melted to produce a seal. One example of a non-melting film material is a paper structure. A paper structure, as used herein, is a structure which is primarily made from paper. In one embodiment paper with a coating is sealed ultrasonically as discussed above. The coating is applied to the paper structure of typical coating processes such as extrusion coating, solution coating, and film lamination processes. The coating can comprise many materials including but not limited to PHA (polyhydroxy-alkanoate), PLA (polylactic acid), aPLA (amorphous polylactic acid), PGA (polyglycolic acid), PBS (poly butyl succinate), aliphatic polyester and/or commercially available sealants such as ECOFLEX made by BASF Corporation in Florham Park, N.J. Additionally the coating can include polyolefins such as polyethylene, polypropylene, polybutylene, etc.

In such embodiments utilizing a paper structure with a coating, the ultrasonic energy melts the coating resulting in a seal. Thus, a paper structure with a coating can be inserted into a vertical form, fill, and seal machine and produce an ultrasonic pillow pouch package. A paper structure is desirable for many reasons including the ability to degrade, cost, etc.

There are several benefits for using the method and apparatus described herein. First, in one embodiment a sealant is unnecessary to provide the seal between two film layers. A sealant refers to a separate layer which is inserted between two layers to be sealed. Typically, the sealant comprised a low melting point and promoted adhesion between the two layers. When the sealant melted, it seals the top and bottom layer together. This sealant is often very expensive. In some embodiments, because ultrasonic energy is used to seal the top and bottom layers together there is no need for this sealant as the top and bottom layers themselves are welded. Consequently, the elimination of the need for the sealant results in decreased manufacturing costs and decreased labor costs.

Another benefit to being able to weld across varying number of layers is that it provides for use on a vertical form, fill, and seal machine. These machines typically result in a lap seal, as described above. Prior art sealing devices could not provide a satisfactory seal across a seal with varying numbers of layers. Being able to provide a satisfactory seal allows ultrasonic sealing to be utilized in vertical form, fill, and seal machine that requires a seal across varying number of layers.

Additionally, as noted, stronger seals can be produced compared to prior art seals. A result of this is that fewer parallel seals can be required. As previously noted, often three or more parallel seals are created to provide for seal redundancies and to increase the total strength of the seal. However, by creating stronger individual seals, fewer parallel seals are required. Consequently, comparatively smaller seals can be produced. In one embodiment an end seal width was decreased from a ½ inch to a ¼ inch seal. This results in the saving of film material which reduces manufacturing costs.

Furthermore, the method discussed, in one embodiment, provides the ability to seal through product. This is a great benefit which greatly reduces or eliminates failed seals. Previously if a chip or other product was in the area to be sealed, then the product prevented the formation of a proper seal and resulted in packaging defects. However, in one embodiment, ultrasonic energy fractures the product and pushes the product to either side of the joint resulting in the formation of an adequate seal. Consequently, the number of rejected packages due to a failed seal is significantly reduced.

While the invention has been particularly shown and described with reference to a preferred embodiment, it will be understood by those skilled in the art that various changes in form and detail may be made therein without departing from the spirit and scope of the invention.

Additional Description

The following clauses are offered as further description of the disclosed invention.
1. A sealing device comprising:
 a horn;
 an anvil;
 wherein said horn comprises a non-uniform length, wherein said horn comprises a protrusion and a non-raised portion, wherein said protrusion extends beyond said non-raised portion, and wherein said horn is a rotary horn.

2. The sealing device according to any preceding clause, wherein said horn comprises at least one slot.
3. The sealing device according to any preceding clause, wherein said horn is vertically moveable relative to said anvil.
4. The sealing device according to any preceding clause, further comprising at least one cooling channel.
5. The sealing device according to any preceding clause, further comprising a mechanical stop.
6. A sealing device comprising:
   a horn;
   an anvil;
   wherein said horn comprises a non-uniform length, wherein said horn comprises a protrusion and a non-raised portion, wherein said protrusion extends beyond said non-raised portion, and wherein said horn is a floating horn.
7. The sealing device according to clause 6, wherein said horn comprises at least one slot.
8. The sealing device according to clauses 6-7, wherein said horn is vertically moveable relative to said anvil.
9. The sealing device according to clauses 6-8, further comprising at least one cooling channel.
10. The sealing device according to clauses 6-9, further comprising a mechanical stop.
11. A method of sealing, said method comprising:
    a) feeding at least two work pieces between an ultrasonic horn and an anvil, wherein said at least two work pieces comprise a standard portion and an increased portion;
    b) sealing said two work pieces, wherein said sealing comprises:
       i) providing a force so that a first energy is felt on said standard portion to seal said standard portion; and
       ii) providing a force so that a second energy is felt on said increased portion to seal said increased portion; wherein said first and said second energies are dissimilar.
12. The method according to clause 11, wherein said horn comprises a protrusion and a non-extended portion, wherein said non-extended portion results in said first energy of step i) and wherein said protrusion results in said second energy of step ii).
13. The method according to clauses 11-12, wherein said horn comprises a first horn and a second horn, wherein said first horn results in said energy of step i) and wherein said second horn results in said second energy of step ii).
14. The method according to clause 13, wherein said first and second horns share a transducer.
15. The method according to clause 13, wherein said first and second horns each have a separate transducer.
16. The method according to clause 13, wherein said providing of step ii) comprises increasing the sonication time of said second horn relative to said first horn.
17. The method according to clause 13, wherein at least one of said horns comprises a booster.
18. The method according to clauses 11-17, wherein said method does not comprise a sealant.
19. The method according to clauses 11-18, wherein said horn is a rotary horn.
20. The method according to clause 19, wherein said providing of step ii) comprises increasing the sonication time at said increased portion relative to said standard portion.
21. The method according to clauses 11-20, wherein said horn comprises a non-uniform length.
22. The method according to clauses 11-21, wherein said horn comprises a slotted portion and non-slotted portion.
23. The method according to clauses 11-22, wherein said horn comprises a floating horn.
24. The method according to clauses 11-23, wherein said work pieces comprises film.
25. The method according to clause 24, wherein said film comprises a paper structure.
26. A method of sealing, said method comprising:
    a) feeding at least two work pieces between a horn and an anvil, wherein said at least two work pieces comprise a standard portion and an increased portion;
    b) sealing said two work pieces, wherein said sealing comprises:
       i) providing a force so that energy is felt on said at least two films; and
       ii) cooling said standard portion.
27. The method according to clause 26, wherein uniform energy is applied by said horn to the standard and increased portions.
28. The method according to clauses 26-27, wherein sealing does not comprise the use of a sealant.
29. The method according to clauses 26-28, wherein said cooling comprises cooling channels.
30. The method according to clauses 26-29, wherein said cooling comprises at least one thermal electric cooler.
31. The method according to clauses 26-30, wherein said cooling comprises utilizing different thermal diffusivities.
32. The method according to clauses 26-31, wherein said work pieces comprises films.
33. A sealing device comprising:
    a horn;
    an anvil;
    wherein said anvil comprises a first portion for sealing a standard portion of a film, and a second portion for sealing an increased portion of a film, wherein said first and said second portion of said anvil comprise dissimilar diffusivities.
34. A sealing device comprising:
    a floating horn;
    a support which supports said floating horn;
    a stationary anvil;
    wherein said floating horn comprises a curved face.
35. The sealing device according to clause 34, wherein said support comprises at least one axis of rotation.
36. The sealing device according to clauses 34-35, wherein said support comprises two axis of rotation.
37. The sealing device according to clauses 34-36, wherein said anvil comprises features.
38. The sealing device according to clauses 34-37, wherein said anvil comprises cutting features.
39. The sealing device according to clauses 34-38, wherein said anvil comprises at least one unique feature.
40. A method of sealing, said method comprising:
    a) inserting at least two work pieces between a horn and an anvil, wherein said horn is slanted in a first direction relative to said horn, and wherein said horn comprises a curved face;
    b) engaging said horn;
    c) rotating said horn in a second direction to create a seal, wherein said second direction is opposite to said first direction.
41. The method according to clause 40, wherein said inserting of said a) comprises inserting a variable layered film.
42. The method according to clauses 40-41, further comprising:
    d) disengaging said horn from said anvil;
    f) positioning a work piece;
    g) engaging said horn.

43. The method according to clause 42, wherein said lowering of step g) comprises lowering a horn, wherein said horn is slanted in said second direction.
44. The method according to clause 43, wherein further comprises step h) rotating said horn in said first position to create a seal.
45. The method according to clauses 40-44, wherein said inserting comprises inserting film on a vertical form, fill, and seal machine.
46. The method according to clauses 40-45, wherein said inserting comprises inserting a film comprising a paper structure.
47. A sealing device comprising:
    a horn;
    an anvil, wherein said anvil comprises a high point; and
    a former, wherein said anvil is located on said former.
48. The sealing device according to clause 47, wherein said anvil comprises a curved face.
49. The sealing device according to clauses 47-48, wherein said anvil is removable.
50. The sealing device according to clauses 47-49, wherein said former comprises an inner layer and an outer layer, wherein said anvil is located on top of said outer layer.
51. The sealing device according to clause 50, wherein product flows across said inner layer.
52. The sealing device according to clauses 47-51, wherein said former is located on a vertical form, fill, and seal machine.
53. The sealing device according to clauses 47-52, wherein said anvil comprises a rotating anvil.
54. The sealing device according to clause 53, wherein said anvil comprises unique features.
55. The sealing device according to clauses 47-54, wherein said anvil comprises a curved profile along its width.
56. The sealing device according to clauses 47-55, wherein said former comprises an inner diameter through which product flows, and wherein said inner diameter is unaltered.
57. A method of sealing, said method comprising:
    a) inserting at least two work pieces between a horn and an anvil, wherein said anvil comprises a high point, and wherein said anvil is located on a former;
    b) sealing said at least two work pieces at said high point to create a seal.
58. The method according to clause 57, wherein said anvil comprises a curved face.
59. The method according to clauses 57-58, wherein said anvil comprises a rotating anvil.
60. The method according to clauses 57-59, wherein said sealing comprises creating a back seal.
61. The method according to clauses 57-60, wherein said sealing occurs at a rate greater than 2,000 inches per minute.
62. The method according to clauses 57-61, wherein said sealing occurs at a rate between 200-800 inches per minute.
63. The method according to clauses 57-63, wherein said at least two work pieces comprises films.
64. A method of forming a package, said method comprising:
    a) feeding a film into a form, fill, and seal machine;
    b) forming said packaging film into a tube;
    c) forming an ultrasonic back seal, wherein said forming comprises:
        i) inserting said tube between a horn and an anvil, wherein said anvil comprises a high point, and wherein said anvil is located on said former; and
        ii) sealing said film at said high point with ultrasonic energy to create a back seal;
    d) forming a first ultrasonic end seal to create a partially formed package;
    e) dropping product into said partially formed package;
    f) forming a second ultrasonic end seal to create a sealed package;
    g) cutting said sealed package.
65. The method according to clause 64, wherein said forming of step d) comprises:
    i) inserting said film between a horn and an anvil, wherein said horn is slanted in a first direction relative to said horn, and wherein said horn comprises a curved face;
    ii) engaging said horn;
    iii) rotating said horn in a second direction to create a seal, wherein said second direction is opposite to said first direction.
66. The method according to clauses 64-65, wherein said cutting of step g) and said forming of step f) occur simultaneously.
67. The method according to clauses 64-66, wherein said inserting comprises inserting a film comprising a paper structure.
68. The method according to clauses 64-67, wherein said cutting step g) comprises cutting using a cutting feature on said anvil of step c).
69. The method according to clauses 64-68, wherein said sealed package is a pillow pouch package.

What is claimed is:

1. A sealing device comprising:
    a floating horn;
    a support which supports said floating horn;
    a stationary anvil;
    wherein said floating horn comprises a curved face, the curved face having a smooth continuous surface; and
    wherein said curved face is configured to engage proximate a first end of said anvil as said floating horn is positioned in a first slanted direction relative to said anvil, and to engage said anvil along its length to proximate a second end of said anvil as said floating horn is rotated to a second slanted direction opposite to said first slanted direction.

2. The sealing device of claim 1 wherein said support comprises at least one axis of rotation.

3. The sealing device of claim 1 wherein said support comprises two axis of rotation.

4. The sealing device of claim 1 wherein said anvil comprises features.

5. The sealing device of claim 1 wherein said anvil comprises cutting features.

6. The sealing device of claim 1 wherein said anvil comprises at least one unique feature.

7. A method of sealing, said method comprising:
    a) inserting at least two work pieces between a horn and an anvil, wherein said horn is slanted in a first direction relative to said anvil, and wherein said horn comprises a curved face, the curved face having a smooth continuous surface;
    b) engaging said horn to said anvil with said at least work pieces therebetween;
    c) rotating said horn along the curved face until the horn is slanted in a second direction to create a seal between the at least two work pieces, wherein said second direction is opposite to said first direction.

8. The method of claim 7 wherein said inserting of said a) comprises inserting a variable layered film.

9. The method of claim 7 further comprising:
    d) disengaging said horn from said anvil;
    e) positioning a work piece;
    f) engaging said horn.

10. The method of claim 9 wherein said engaging of step f) comprises lowering a horn, wherein said horn is slanted in said second direction.

11. The method of claim 10 wherein further comprises step g) rotating said horn in said first position to create a seal.

12. The method of claim 7 wherein said inserting comprises inserting film on a vertical form, fill, and seal machine.

13. The method of claim 7 wherein said inserting comprises inserting a film comprising a paper structure.

14. A sealing device comprising:
a horn;
an anvil facing said horn, wherein said anvil comprises a curved face having a high point; and
a former, wherein said anvil is located on said former with said curved face extending from the former,
wherein said curved face is configured to engage proximate a first end of said horn as said anvil is positioned in a first slanted direction relative to said horn, and to engage said horn along its length to proximate a second end of said horn as said anvil is rotated to a second slanted direction opposite to said first slanted direction.

15. The sealing device of claim 14 wherein said curved face has a smooth continuous surface.

16. The sealing device of claim 14 wherein said anvil is removable.

17. The sealing device of claim 14 wherein said former comprises an inner layer and an outer layer, wherein said anvil is located on top of said outer layer.

18. The sealing device of claim 17 wherein product flows across said inner layer.

19. The sealing device of claim 14 wherein said former is located on a vertical form, fill, and seal machine.

20. The sealing device of claim 14 wherein said anvil comprises a rotating anvil.

21. The sealing device of claim 20 wherein said anvil comprises unique features.

22. The sealing device of claim 14 wherein said anvil comprises a curved profile along its width.

23. The sealing device of claim 14 wherein said former comprises an inner diameter through which product flows, and wherein said inner diameter is unaltered.

24. A method of sealing, said method comprising:
a) inserting at least two work pieces between a horn and an anvil, wherein said anvil comprises a curved face having a high point, and wherein said anvil is located on a former with said curved face extending from the former;
b) sealing said at least two work pieces at said high point to create a seal by:
(i) engaging a first end of said horn against said curved face with said at least two work pieces therebetween as said anvil is positioned in a first slanted direction relative to said horn, and
(ii) engaging said horn along its length to proximate a second end of said horn with said at least two work pieces therebetween as said anvil is rotated to a second slanted direction opposite to said first slanted direction.

25. The method of claim 24 wherein said curved face has a smooth continuous surface.

26. The method of claim 24 wherein said anvil comprises a rotating anvil.

27. The method of claim 24 wherein said sealing comprises creating a back seal.

28. The method of claim 24 wherein said sealing occurs at a rate greater than 2,000 inches per minute.

29. The method of claim 24 wherein said sealing occurs at a rate between 200-800 inches per minute.

30. The method of claim 24 wherein said at least two work pieces comprises films.

31. A method of forming a package, said method comprising:
a) feeding a packaging film into a form, fill, and seal machine;
b) forming said packaging film into a tube;
c) forming an ultrasonic back seal on said tube, wherein said forming an ultrasonic back film comprises:
i) inserting said tube between a horn and an anvil, wherein said anvil comprises a high point, and wherein said anvil is located on said former; and
ii) sealing said packaging film at said high point with ultrasonic energy to create said back seal;
d) forming a first ultrasonic end seal on said tube to create a partially formed package, wherein said forming a first ultrasonic end seal comprises:
i) inserting said packaging film between a horn and an anvil, wherein said horn is slanted in a first direction relative to said anvil, and wherein said horn comprises a curved face;
ii) engaging said horn; and
iii) rotating said horn along the curved face until the horn is slanted in a second direction to create a seal, wherein said second direction is opposite to said first direction;
e) dropping product into said partially formed package;
f) forming a second ultrasonic end seal on said tube to create a sealed package; and
g) cutting said sealed package.

32. The method of claim 31 wherein said cutting of step g) and said forming of step f) occur simultaneously.

33. The method of claim 31 wherein said inserting comprises inserting a film comprising a paper structure.

34. The method of claim 31 wherein said cutting step g) comprises cutting using a cutting feature on said anvil of step c).

35. The method of claim 31 wherein said sealed package is a pillow pouch package.

* * * * *

UNITED STATES PATENT AND TRADEMARK OFFICE
CERTIFICATE OF CORRECTION

| | | |
|---|---|---|
| PATENT NO. | : 9,090,021 B2 | Page 1 of 1 |
| APPLICATION NO. | : 13/565310 | |
| DATED | : July 28, 2015 | |
| INVENTOR(S) | : Pak Meng Cham et al. | |

It is certified that error appears in the above-identified patent and that said Letters Patent is hereby corrected as shown below:

In the Claims

In column 18, line 62, claim 8, please add --step-- after "said" and before "a)", such that Claim 8 reads as follows:

8. The method of claim 7 wherein said inserting of said step a) comprises inserting a variable layered film.

In column 19, line 4, claim 11, please add --said method-- after "wherein" and before "further", such that claim 11 reads as follows:

11. The method of claim 10 wherein said method further comprises step g) rotating said horn in said first position to create a seal.

In column 19, line 6, claim 12, please add --a-- after "inserting" and before "film", such that claim 12 reads as follows:

12. The method of claim 7 wherein said inserting comprises inserting a film on a vertical form, fill, and seal machine.

Signed and Sealed this
First Day of December, 2015

Michelle K. Lee
*Director of the United States Patent and Trademark Office*